US012801652B2

(12) United States Patent
Fatemi et al.

(10) Patent No.: US 12,801,652 B2
(45) Date of Patent: Nov. 17, 2026

(54) LOW POWER BIDIRECTIONAL ENCODER REPRESENTATIONS FROM TRANSFORMERS MODEL WITH NUMERICAL PROCESSING CAPABILITIES

(71) Applicant: JPMorgan Chase Bank, N.A., New York, NY (US)

(72) Inventors: Zahra Fatemi, Weehawken, NJ (US); Ankur Mohan, New York, NY (US); Davood Shamsi, Weehawken, NJ (US); Jay Katukuri, Saratoga, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/999,598

(22) Filed: Dec. 23, 2024

(65) Prior Publication Data

US 2026/0178647 A1 Jun. 25, 2026

(51) Int. Cl.
*G06F 16/353* (2025.01)
*G06F 16/334* (2025.01)

(52) U.S. Cl.
CPC ........ *G06F 16/353* (2019.01); *G06F 16/3344* (2019.01)

(58) Field of Classification Search
CPC ...................................................... G06F 16/353
See application file for complete search history.

(56) References Cited

U.S. PATENT DOCUMENTS

2022/0351071 A1* 11/2022 Li ......................... G06F 16/217
2023/0100679 A1* 3/2023 Fan ....................... G06F 16/256 706/12
2024/0013564 A1* 1/2024 Kim ..................... G06V 10/454
2024/0028958 A1* 1/2024 Ni .......................... G06N 20/00
2024/0086637 A1* 3/2024 Cui ........................ G06F 40/284
2024/0126993 A1* 4/2024 Cheng ..................... G06F 40/30

* cited by examiner

*Primary Examiner* — Van H Oberly
(74) *Attorney, Agent, or Firm* — GREENBLUM & BERNSTEIN, P.L.C.

(57) ABSTRACT

A low power Bidirectional Encoder Representations from Transformers (BERT) model natural language processor is provided. The methodology includes: creating a set of non-sequential data points from user data including numerical features; first binning overlapping types of numerical features from the non-sequential data points into consecutive numbers; first allocating the consecutive numbers as binned into a plurality of quantiles; first assigning a first category token to each of the plurality of quantiles, each of the first category tokens being BERT compatible; creating a time ordered sequence of transactions of the user including text features and numerical features; second assigning second category tokens to the time ordered sequence of user transactions; concatenating the first category tokens and the second category tokens into a sequence; pre-training the BERT model based on the sequence; and submitting a query including text features and numerical features to the trained BERT model.

20 Claims, 8 Drawing Sheets

1100

LOW POWER BIDIRECTIONAL ENCODER REPRESENTATIONS FROM TRANSFORMERS MODEL WITH NUMERICAL PROCESSING CAPABILITIES

TECHNICAL FIELD

This disclosure relates to methods and apparatuses for training and deploying a low power Bidirectional Encoder Representations from Transformers (BERT) model that can process numerical features.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Bidirectional Encoder Representations from Transformers (BERT) is a model in the field of Natural Language Processing (NLP). In contrast to models that process text sequentially, BERT can process all words in a sentence simultaneously and learn relationships between them, regardless of their position in the sentence.

Specifically, traditional models often read input text in a left-to-right or right-to-left manner. In contrast, BERT reads text in both directions simultaneously to use context from both the left and right of a word to generate a more nuanced understanding of that word. For example, the word "bank" can mean a financial institution or the side of a river, and BERT can disambiguate it by considering the surrounding words in both directions.

The BERT model includes pre-training on text with two main objectives. First, a Masked Language Model (MLM) randomly masks words in a sentence and trains the model to predict the masked words based on the surrounding context. Second, a Next Sentence Prediction (NSP) predicts whether two given sequences are consecutive sentences in the dataset. Through these pre-training objectives, BERT learns meaningful token embeddings that capture syntactic and semantic relationships within the text vocabulary. After pre-training, the model can be fine-tuned for specific NLP tasks such as question answering, text summarization, predictions, and sentiment classification.

A technical problem with BERT is that it was designed primarily for text, not numbers. BERT treats numbers as just tokens in the input text, missing their full potential for tasks like arithmetic operations or understanding large quantities. For example, BERT's methodology of splitting words into subword units struggles with numbers with different formats. BERT may split numbers into smaller subwords or treat them as out-of-vocabulary tokens, leading to loss of numerical meaning. For example, a year like "2024" could be split into parts (e.g., "202" and "4"), which doesn't capture the intended meaning of the entire number. Also, BERT does not have explicit mechanisms for understanding numeric relationships or magnitudes. For instance, BERT might treat the numbers "1000" and "1,000" or "3" and "3.00" differently, despite being the same value. BERT, therefore cannot be used in its native form to work with any content that has any significant amount of numerical content.

Due to these technical problems, BERT is generally not used in environments that have mixed text and numbers and/or large numbers, such as environments that use identification data with names, addresses, phone numbers, transaction information, financial information, etc. For example, BERT has not been effectively used to predict customer behavior based on commercial transactions, as the BERT model cannot handle all of the numerical data in prior transactions from which predictions can be made.

There have been attempts to modify transformer-based NLP models such as BERT to improve performance with numbers. Current approaches often rely on constructing embeddings for numerical features using parametric mappings, such as linear functions.

While this allows for the inclusion of numerical data, these methods fail to fully capture the complex, non-linear relationships inherent in numerical time-series data as often found in transactions. Moreover, these parametric mappings do not leverage the strengths of transformers in learning contextual relationships over sequential data, which limits the model's ability to make accurate predictions in hybrid text-number scenarios.

The lack of accuracy introduces its own technical problem in the consumption of excess power. NLPs, particularly those run by AI, receive text prompts and provide a corresponding response. Due to the inaccurate nature of the traditional approaches, if the user is not satisfied with the response, the user will then typically generate a modified prompt based on the prior response and receive a new one. If this new response is not satisfactory, the process can continue indefinitely. Each prompt submission consumes a great deal of electrical power, such that continual resubmission of modified prompts in search of a satisfactory response consumes that much more electrical power. Simply stated, receiving a satisfactory answer after ten prompt submissions consumes far more power than receiving a satisfactory response after one prompt submission. And that presumes that a satisfactory answer is reached at all, for which, if it is not, all the power consumed to that point is completely wasted.

SUMMARY

The present disclosure, through one or more of its various aspects, embodiments, and/or specific features or sub-components, provides, among other features, various systems, servers, devices, methods, media, programs, and platforms for using a low power (BERT) model that can handle and process numerical features.

According to an aspect of the present disclosure a method is provided. For example, the method may include: creating, for a user, a set of non-sequential data points from user data including numerical features; first binning overlapping types of numerical features from the non-sequential data points into consecutive numbers; first allocating the consecutive numbers as binned into a plurality of quantiles; first assigning a first category token to each of the plurality of quantiles, each of the first category tokens being BERT compatible; creating a time ordered sequence of transactions of the user including text features and numerical features; second assigning second category tokens to the time ordered sequence of user transactions; concatenating the first category tokens and the second category tokens into a sequence; pre-training the BERT model based on the sequence; and submitting a query including text features and numerical features to the trained BERT model.

The described implementations may also include one or more of the following features. The method may include masking, between the second assigning and the concatenating, at least some of the second category tokens. The method may include maintaining, between the second assigning and the concatenating, the first category tokens in an unmasked state. The method may include disabling Next Sentence Prediction from the BERT prior to the submitting, where the BERT processes the query without applying the Next Sentence Prediction. The sequence may include a marker token between the first category tokens and the second category tokens, the marker token representing an end of first category tokens and a beginning of the second category tokens. The method may include: determining latitude and longitude coordinates for the transactions; second binning latitude coordinates and longitudinal coordinates from the transactions into a first set and a second set of consecutive numbers, respectively; second allocating the first set and the second set into quantiles; and third assigning a second category token to each of the quantiles from the second allocating. The method may include: combining positional encoding with the second category tokens from the first and second assigning and concatenating the first category tokens with the result of the combining, where the pre-training the BERT model based on the sequence may include pre-training the BERT model with the result of the concatenating. The method may include establishing a loss function for the BERT model to apply on results of numbers subject to the first binning. The non-sequential data points from user data may include, for the user, a number of credit cards, total personal checking and savings account count, and/or average daily balance across personal accounts. Implementations of the described techniques may include hardware, a method or process, or a computer tangible medium. The second assigning may include for the numerical features of the time ordered sequence of transactions: third binning overlapping types of numerical features from the time ordered sequence of transactions into consecutive numbers; third allocating the consecutive numbers as binned into a plurality of quantiles; and fourth assigning a second category token to each of the plurality of quantiles from the third allocating, each of the second category tokens being BERT compatible. The second assigning may include for the text features of the time ordered sequence of transactions: fifth assigning a second category token to each of the text features; and encoding the second category tokens of the fifth assigning into BERT compatible format.

According to an aspect of the present disclosure, a non-transitory computer-readable medium stores a set of instructions for processing a combination of text and numbers by a Bidirectional Encoder Representations from Transformers (BERT) model natural language processor. The set of instructions, when executed by one or more processors of a device, cause the device to perform operations is provided. For example, the operations may include creating, for a user, a set of non-sequential data points from user data including numerical features. The operations may also include first binning overlapping types of numerical features from the non-sequential data points into consecutive numbers. The operations may furthermore include first allocating the consecutive numbers as binned into a plurality of quantiles. The operations may in addition include first assigning a first category token to each of the plurality of quantiles, each of the first category tokens being BERT compatible. The operations may moreover include creating a time ordered sequence of transactions of the user including text features and numerical features. The operations may also include second assigning second category tokens to the time ordered sequence of user transactions. The operations may furthermore include concatenating the first category tokens and the second category tokens into a sequence. The operations may in addition include pre-training the BERT model based on the sequence. The operations may moreover include submitting a query including text features and numerical features to the trained BERT model.

The described implementations may also include one or more of the following features. The operations may include masking, between the second assigning and the concatenating, at least some of the second category tokens. The operations may include maintaining, between the second assigning and the concatenating, the first category tokens in an unmasked state. The operations may include disabling Next Sentence Prediction from the BERT prior to the submitting, where the BERT processes the query without applying the Next Sentence Prediction. The sequence may include a marker token between the first category tokens and the second category tokens, the marker token representing an end of first category tokens and a beginning of the second category tokens. The operations may include determining latitude and longitude coordinates for the transactions; second binning latitude coordinates and longitudinal coordinates from the transactions into a first set and a second set of consecutive numbers, respectively; second allocating the first set and the second set into quantiles; and third assigning a second category token to each of the quantiles from the second allocating. The operations may include combining positional encoding with the second category tokens from the first and second assigning, and concatenating the first category tokens with the result of the combining, where the pre-training the BERT model based on the sequence may include pre-training the BERT model with the result of the concatenating. The operations may include: establishing a loss function for the BERT model to apply on results of numbers subject to the first binning. The non-sequential data points from user data may include, for the user, a number of credit cards, total personal checking and savings account count, and/or average daily balance across personal accounts. The second assigning may include for the numerical features of the time ordered sequence of transactions: third binning overlapping types of numerical features from the time ordered sequence of transactions into consecutive numbers; third allocating the consecutive numbers as binned into a plurality of quantiles; and fourth assigning a second category token to each of the plurality of quantiles from the third allocating, each of the second category tokens being BERT compatible. The second assigning may include for the text features of the time ordered sequence of transactions: fifth assigning a second category token to each of the text features; and encoding the second category tokens of the fifth assigning into BERT compatible format.

According to an aspect of the present disclosure, a system for processing a combination of text and numbers by a Bidirectional Encoder Representations from Transformers (BERT) model natural language processor is provided. The system includes a processor and a non-transitory computer readable storage media storing a set of instructions programmed to cooperate with the processor to cause the processor to perform operations. For example, the operations may include creating, for a user, a set of non-sequential data points from user data including numerical features. The operations may also include first binning overlapping types of numerical features from the non-sequential data points into consecutive numbers. The operations may furthermore include first allocating the consecutive numbers as binned into a plurality of quantiles. The operations may in addition include first assigning a first category token to each of the plurality of quantiles, each of the first category tokens being BERT compatible. The operations may moreover include creating a time ordered sequence of transactions of the user including text features and numerical features. The operations may also include second assigning second category tokens to the time ordered sequence of user transactions. The operations may furthermore include concatenating the first category tokens and the second category tokens into a sequence. The operations may in addition include pre-training the BERT model based on the sequence. The operations may moreover include submitting a query including text features and numerical features to the trained BERT model.

The described implementations may also include one or more of the following features. The operations may include masking, between the second assigning and the concatenating, at least some of the second category tokens. The operations may include maintaining, between the second assigning and the concatenating, the first category tokens in an unmasked state. The operations may include disabling Next Sentence Prediction from the BERT prior to the submitting, where the BERT processes the query without applying the Next Sentence Prediction. The sequence may include a marker token between the first category tokens and the second category tokens, the marker token representing an end of first category tokens and a beginning of the second category tokens. The operations may include: determining latitude and longitude coordinates for the transactions; second binning latitude coordinates and longitudinal coordinates from the transactions into a first set and a second set of consecutive numbers, respectively; second allocating the first set and the second set into quantiles; and third assigning a second category token to each of the quantiles from the second allocating. The operations may include combining positional encoding with the second category tokens from the first and second assigning and concatenating the first category tokens with the result of the combining, where the pre-training the BERT model based on the sequence may include pre-training the BERT model with the result of the concatenating. The operations may include: establishing a loss function for the BERT model to apply on results of numbers subject to the first binning. The non-sequential data points from user data may include, for the user, a number of credit cards, total personal checking and savings account count, and/or average daily balance across personal accounts. The second assigning may include for the numerical features of the time ordered sequence of transactions: third binning overlapping types of numerical features from the time ordered sequence of transactions into consecutive numbers; third allocating the consecutive numbers as binned into a plurality of quantiles; and fourth assigning a second category token to each of the plurality of quantiles from the third allocating, each of the second category tokens being BERT compatible. The second assigning may include for the text features of the time ordered sequence of transactions: fifth assigning a second category token to each of the text features; and encoding the second category tokens of the fifth assigning into BERT compatible format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
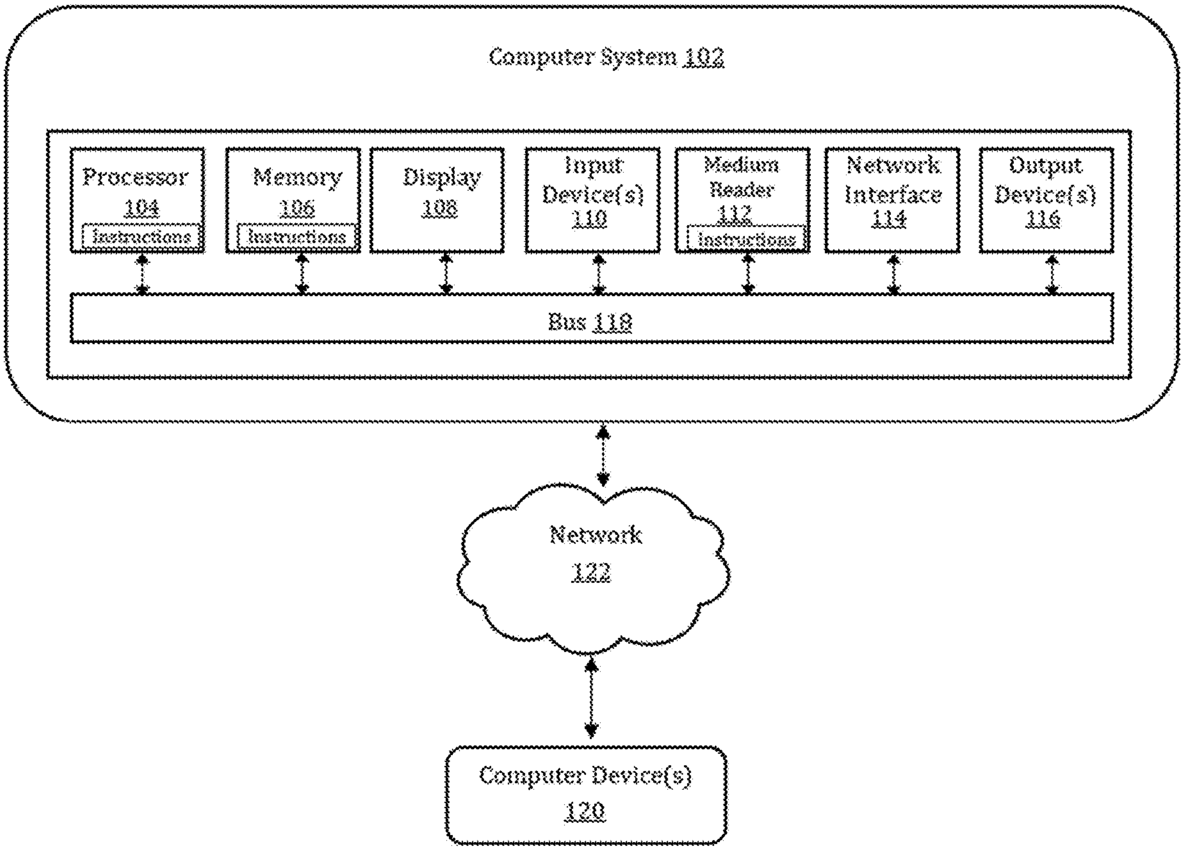
FIG. 1 illustrates a computer system for implementing a method for using an AI/ML model in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

References to any "example" herein (e.g., "for example", "an example of", by way of example" or the like) are to be considered non-limiting examples regardless of whether expressly stated or not.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Several definitions that apply throughout this disclosure will now be presented.

The terms "substantial", "substantially" or the like are defined to be essentially conforming to the particular dimension, shape, or other feature that the term modifies, such that the component need not be exact. For example, "substantially cylindrical" means that the object resembles a cylinder, but can have one or more deviations from a true cylinder. The terms are used as a modifier to imply "approximate" rather than "perfect." It is a term of approximation, not a term of degree.

The term "comprising" when utilized means "including, but not necessarily limited to"; it specifically indicates open-ended inclusion or membership in the so-described combination, group, series and the like.

The term "a" means "one or more" unless the context clearly indicates a single element.

The term "about" when used in connection with a numerical value means a variation consistent with the range of error in equipment used to measure the values, for which ±5% may be expected.

"First," "second," etc., re labels to distinguish components or blocks of otherwise similar names, but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

FIG. 1 is an exemplary system 100 for use in implementing a methodology for training and deploying a low power BERT model that can process numerical features, in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the modules implemented by the system 100 may be platform, language, database, and cloud agnostic that may allow for consistent easy orchestration and passing of data through various components to output a desired result regardless of platform, browser, language, database, and cloud environment by writing programs accordingly. The configuration or data files, in some embodiments, may be written using JavaScript Object Notation (JSON), but the disclosure is not limited thereto. For example, the configuration or data files may easily be extended to other readable file formats such as Extensible Markup Language (XML), YAML Ain't Markup Language (YAML), etc., or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
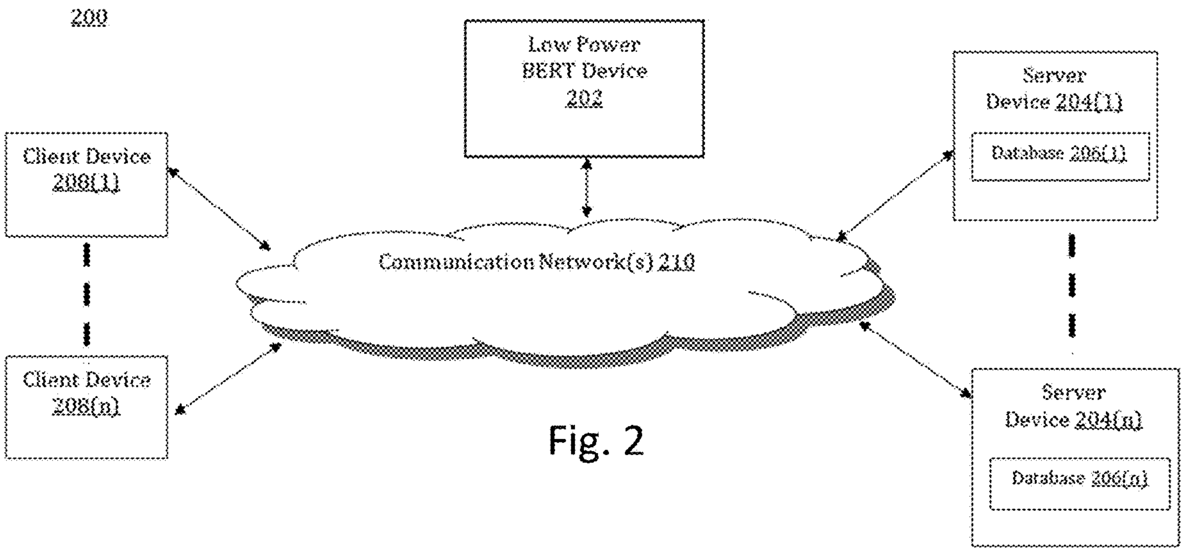
FIG. 2 illustrates an exemplary diagram of a network environment with a device for training and deploying a low power BERT model that can process numerical features in accordance with an embodiment.

Referring to FIG. 2, a schematic of an exemplary network environment 200 for training and deploying a low power BERT device (LPBERTD) that can process numerical features of the instant disclosure is illustrated.

In some embodiments, the above-described problems associated with conventional tools may be overcome by implementing an LPBERTD 202 as illustrated in FIG. 2 that may be configured for implementing a method for using an AI/ML model to perform training and deploying a low power BERT model that can process numerical features, but the disclosure is not limited thereto.

The LPBERTD 202 may have one or more computer system 102*s*, as described with respect to FIG. 1, which in aggregate provide the necessary functions.

The LPBERTD 202 may store one or more applications that can include executable instructions that, when executed by the LPBERTD 202, cause the LPBERTD 202 to perform actions, such as to transmit, receive, or otherwise process network messages, for example, and to perform other actions described and illustrated below with reference to the figures. The application(s) may be implemented as modules or components of other applications. Further, the application (s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LPBERTD 202 itself, may be located in virtual server(s) running in a cloud-based computing environment rather than being tied to one or more specific physical network computing devices. Also, the application(s) may be running in one or more virtual machines (VMs) executing on the LPBERTD 202. Additionally, in one or more embodiments of this technology, virtual machine(s) running on the LPBERTD 202 may be managed or supervised by a hypervisor.

In the network environment 200 of FIG. 2, the LPBERTD 202 is coupled to a plurality of server devices **204(1)-204(*n*) that hosts a plurality of databases 206(1)-206(*n*), and also to a plurality of client devices 208(1)-208(*n*) via communication network(s) 210. A communication interface of the LPBERTD 202, such as the network interface 114 of the computer system 102 of FIG. 1, operatively couples and communicates between the LPBERTD 202, the server devices 204(1)-204(*n*), and/or the client devices 208(1)-208 (*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LPBERTD 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LPBERTD 202 may be a standalone device or integrated with one or more other devices or apparatuses, such as one or more of the server devices **204(1)-204(*n*), for example. In one particular example, the LPBERTD 202 may be hosted by one of the server devices 204(1)-204(*n*), and other arrangements are also possible. Moreover, one or more of the devices of the LPBERTD 202** may be in the same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the LPBERTD 202 via the communication network(s) 210** according to the HyperText Transfer Protocol (HTTP)-based and/or JSON protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206(*n*)** that are configured to store various types of data.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*)**.

In some embodiments, the client devices **208(1)-208(*n*) in this example may include any type of computing device that can facilitate the implementation of the LPBERTD 202** that may efficiently provide a platform for implementing a methodology for training and deploying a low power BERT model that can process numerical features in an accurate and efficient manner, but the disclosure is not limited thereto.

The client devices **208(1)-208(*n*) may run interface applications, such as standard web browsers or standalone client applications, which may provide an interface to communicate with the LPBERTD 202 via the communication network(s) 210 in order to communicate user requests. The client devices 208(1)-208(*n*)** may further include, among other features, a display device, such as a display screen or touchscreen, and/or an input device, such as a keyboard, for example.

Although the exemplary network environment 200 with the LPBERTD 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the LPBERTD 202, the server devices **204(1)-204(*n*), or the client devices 208(1)-208(*n*), for example, may be configured to operate as virtual instances on the same physical machine. For example, one or more of the LPBERTD 202, the server devices 204(1)-204(*n*), or the client devices 208(1)-208(*n*) may operate on the same physical device rather than as separate devices communicating through communication network(s) 210. Additionally, there may be more or fewer LPBERTDs 202, server devices 204(1)-204(*n*), or client devices 208(1)-208(*n*) than illustrated in FIG. 2. In some embodiments, the LPBERTD 202 may be configured to send code at run-time to remote server devices 204(1)-204(*n*)**, but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
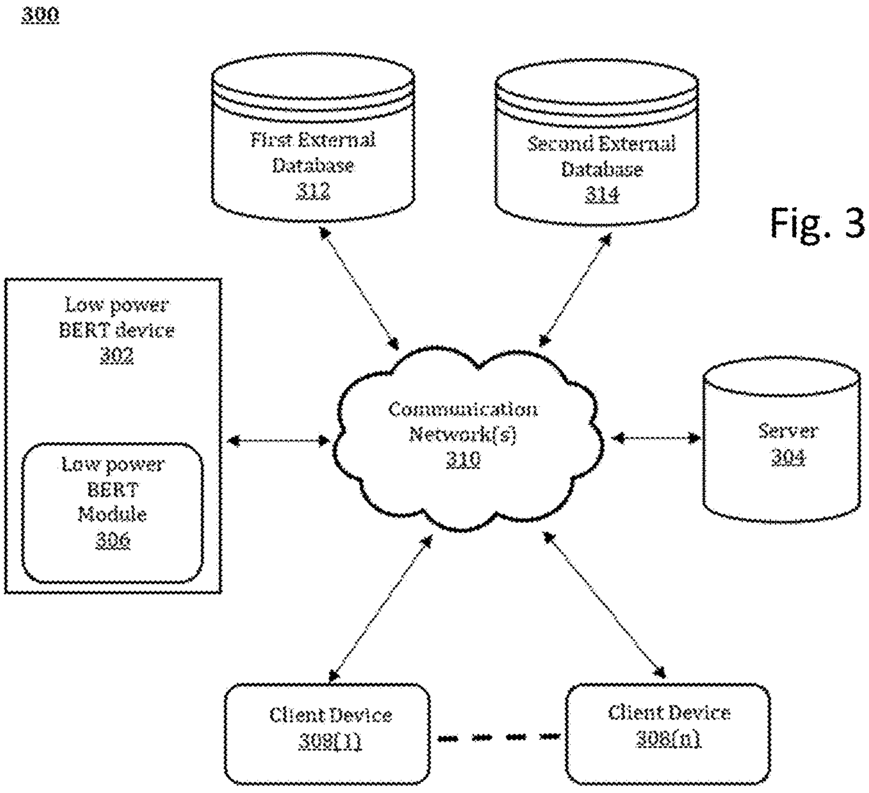
FIG. 3 illustrates a system diagram for implementing a method for training and deploying a low power BERT model that can process numerical features in accordance with an embodiment.

FIG. 3 illustrates a system diagram for implementing an LPBERTD 302 having a low power BERT module (LPBERTM), in accordance with an embodiment.

As illustrated in FIG. 3, the system 300 may include an LPBERTD 302 within which an LPBERTM 306 is embedded, a server 304, a first external database 312, a second external database 314, a plurality of client devices 308(1) . . . **308(*n*), and a communication network 310**.

In some embodiments, the LPBERTD 302 including the LPBERTM 306 may be connected to the server 304, and the database(s) 312 via the communication network 310. The LPBERTD 302 may also be connected to the plurality of client devices 308(1) . . . **308(*n*) via the communication network 310**, but the disclosure is not limited thereto.

In an embodiment, the LPBERTD 302 is described and shown in FIG. 3 as including the LPBERTM 306, although it may include other rules, policies, modules, databases, or applications, for example. In some embodiments, the first external database 312 and/or the second external database 314 may be configured to store ready to use modules written for each application programming interface (API) for all environments. Although only one database is illustrated in FIG. 3, the disclosure is not limited thereto. Any number of desired databases may be utilized for use in the disclosed invention herein. The databases 312, 314 may be a mainframe database, a log database that may produce programming for searching, monitoring, and analyzing machine-generated data via a web interface, etc., but the disclosure is not limited thereto.

In some embodiments, the LPBERTM 306 may be configured to receive real-time feed of data from the plurality of client devices 308(1) . . . **308(*n*) and secondary sources via the communication network 310**.

The plurality of client devices 308(1) . . . **308(*n*) are illustrated as being in communication with the LPBERTD 302. In this regard, the plurality of client devices 308(1)** . .

. 308(*n*) may be "clients" (e.g., customers) of the LPBERTD 302 and are described herein as such. Nevertheless, it is to be known and understood that the plurality of client devices 308(1) . . . 308(*n*) need not necessarily be "clients" of the LPBERTD 302, or any entity described in association therewith herein. Any additional or alternative relationship may exist between either or both of the plurality of client devices 308(1) . . . 308(*n*) and the LPBERTD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(*n*) may communicate with the LPBERTD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The LPBERTD 302 may be the same or similar to the LPBERTD 202 as described with respect to FIG. 2, including any features or combination of features described with respect thereto.

Figure 4:
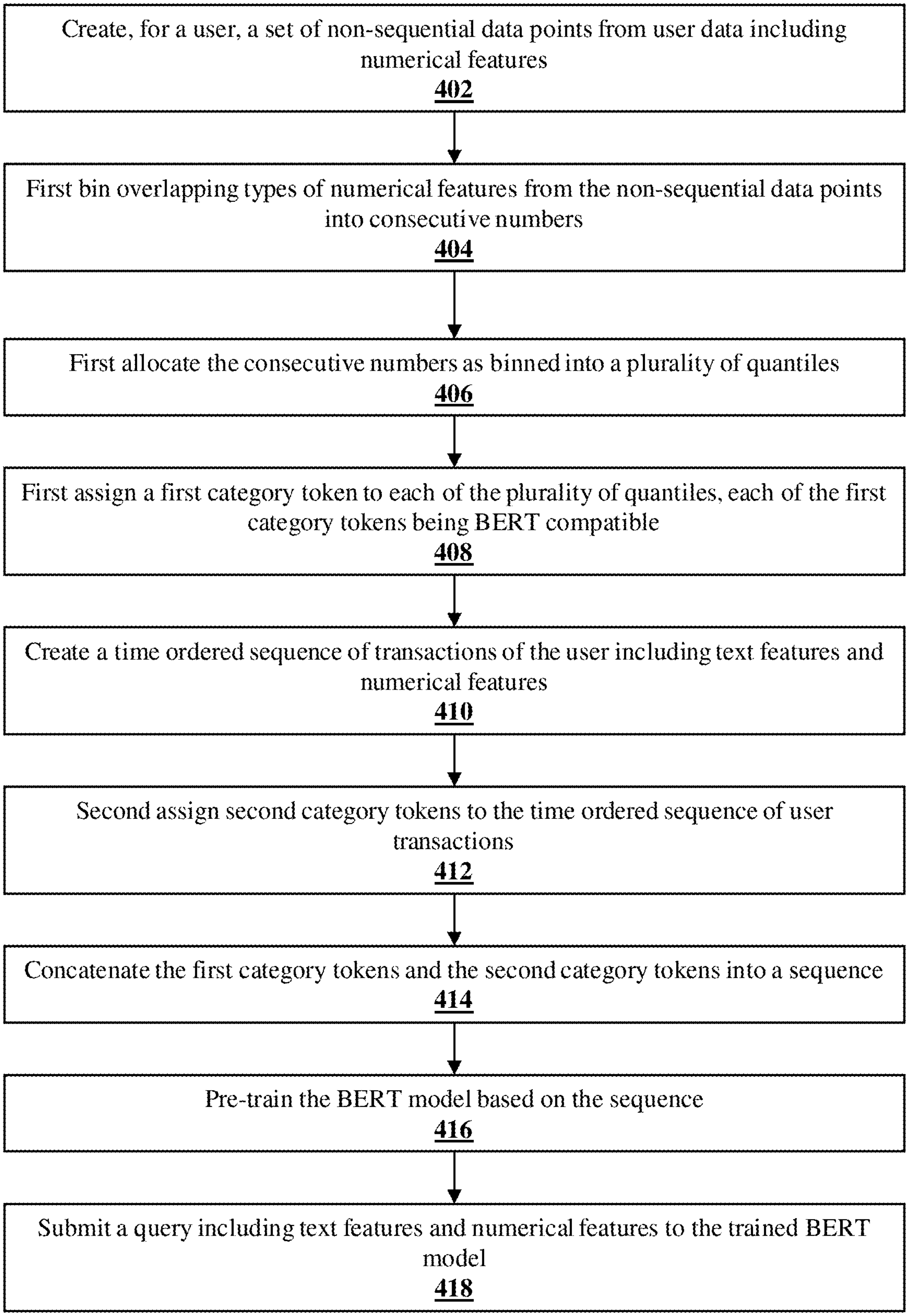
FIG. 4 illustrates an exemplary flow chart of a process for training and deploying a low power BERT model that can process numerical features, in accordance with an embodiment.

FIG. 4 illustrates an exemplary flow chart of a process 400 implemented by the LPBERTM 306 of FIG. 3 for enablement of a system and a method for training and deploying a low power BERT model that can process numerical features in an accurate and efficient manner, in accordance with an embodiment. It may be appreciated that the illustrated process 400 and associated steps may be performed in a different order, with illustrated steps omitted, with additional steps added, or with a combination of reordered, combined, omitted, or additional steps.

As illustrated in FIG. 4, at step S402, the methodology may include creating, for a user, a set of non-sequential data points from user data including numerical features. Non-limiting examples of non-sequential data points include for a particular user a number of credit cards, total personal checking and savings account count, and average daily balance across personal accounts.

At step 404, the methodology may include first binning overlapping types of numerical features from the non-sequential data points into consecutive numbers. By way of non-limiting example, a number of credit cards is one overlapping type of numerical features, total personal checking and savings account count is another type, etc.

At step 406, the methodology may include first allocating the consecutive numbers as binned into a plurality of quantiles.

At step 408, the process 400 may include first assigning a first category token to each of the plurality of quantiles, each of the first category tokens being BERT compatible.

At step 410, the process 400 may include creating a time ordered sequence of transactions of the user including text features and numerical features. By way of non-limiting example, the sequence may be a series of transactions, with each transaction including a merchant name, amount of the transaction, time of the transaction, and location of the transaction.

At step 412, process 400 may include second assigning second category tokens to the time ordered sequence of user transactions.

At step 414, process 400 may include concatenating the first category tokens and the second category tokens into a sequence.

At step 416, the process 400 may include pre-training the BERT model based on the sequence.

Figure 11:
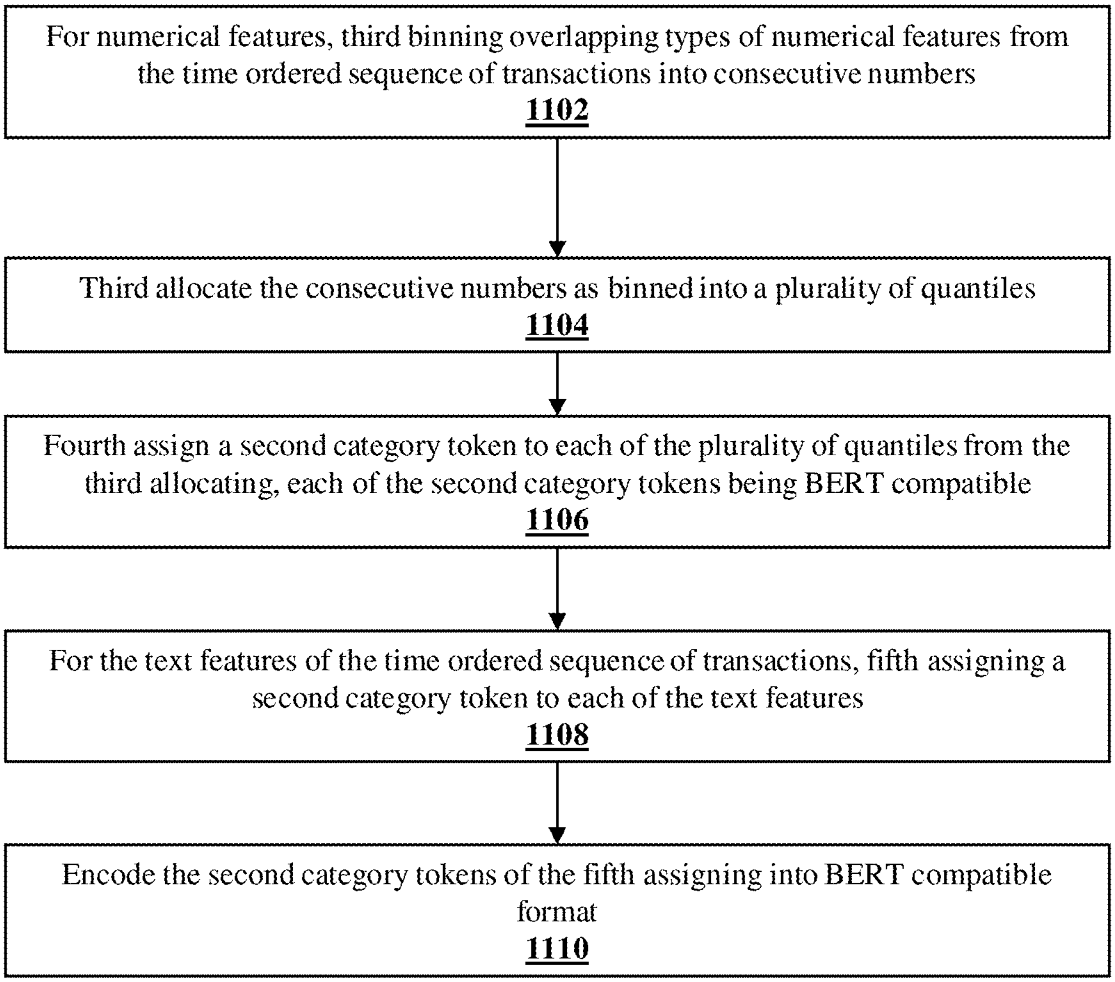
FIG. 11 illustrates an exemplary flow chart of a process for training and deploying a low power BERT model that can process numerical and textual features, in accordance with an embodiment.

At step 418, the process 400 may include submitting a query including text features and numerical features to the trained BERT model. The BERT model per the above process 400 will be able to handle the combination of text features and numerical features in a manner that a traditional BERT model simply could not The second assigning at step 412 may its own process 1100 as shown in FIG. 11. For the numerical features of the time ordered sequence of transactions, at step 1102 the process 1100 may include third binning overlapping types of numerical features from the time ordered sequence of transactions into consecutive numbers.

At step 1104, the process 1100 may include third allocating the consecutive numbers as binned into a plurality of quantiles.

At step 1106, the process 1100 may include fourth assigning a second category token to each of the plurality of quantiles from the third allocating, each of the second category tokens being BERT compatible.

For the text features of the time ordered sequence of transactions, at step 1108 the process 1100 may include fifth assigning a second category token to each of the text features.

At step 1110, the process 1100 may include encoding the second category tokens of the fifth assigning into BERT compatible format.

Figure 5:
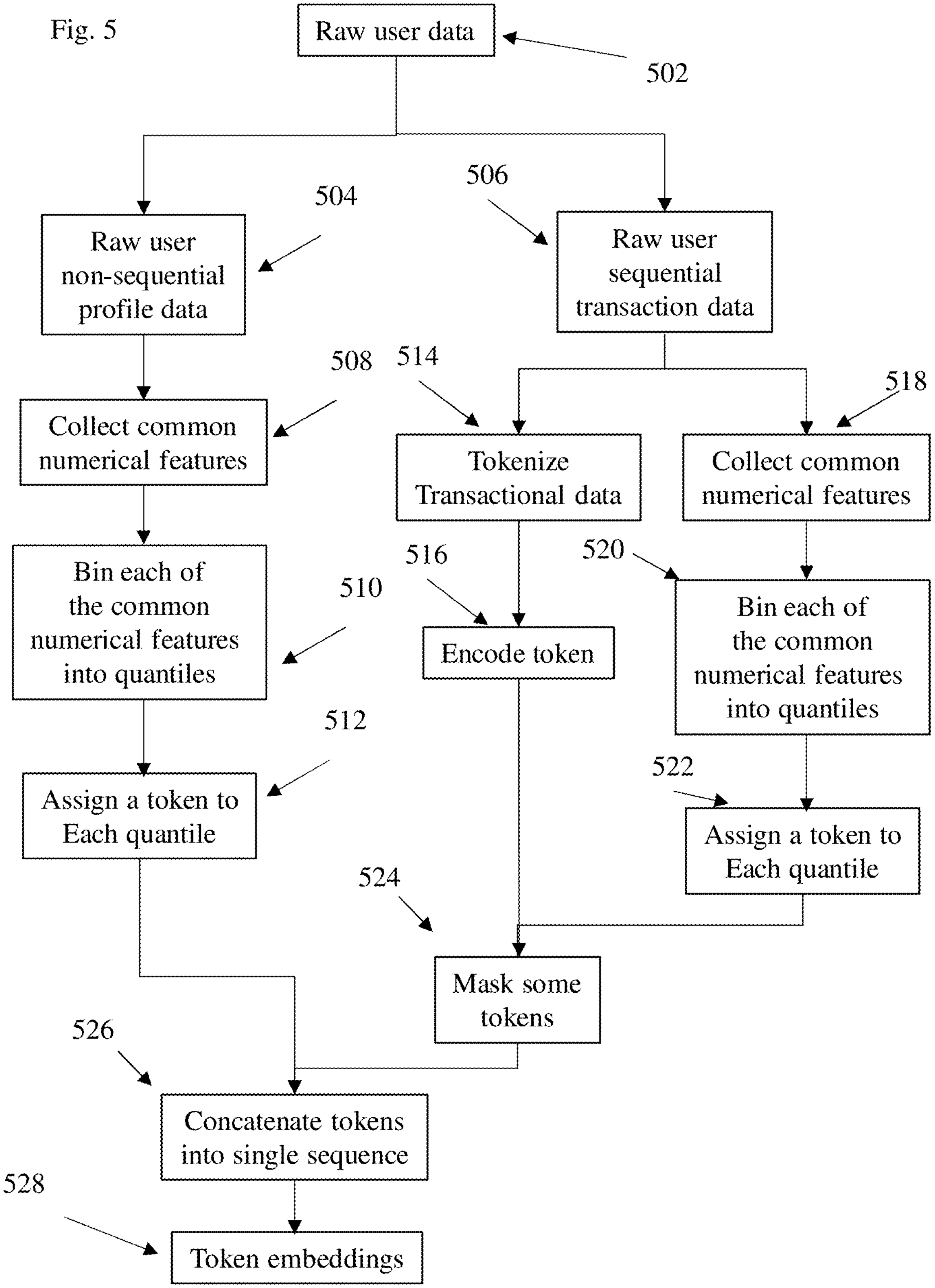
FIG. 5 illustrates a pre-training methodology that corresponds to a process for training and deploying a low power Bidirectional Encoder Representations from Transformers (BERT) model that can process numerical features, in accordance with an embodiment.

Referring now to FIG. 5, beginning with raw user data 502, the methodology separates the raw user data into two different categories. The first category 504 includes heterogenous, non-sequential data points for user profile data that includes numerical features. Non-limiting examples of non-sequential data points include the number of credit cards, total personal checking and savings account count, and average daily balance across personal accounts.

The second category 506 is time-ordered sequences of heterogenous customer transaction related features for specific transactions of the user and may include both textual and numerical features. Non-limiting examples include merchant names, transaction amount, time of transaction, and merchant location. By way of non-limiting example, a transaction may be Starbucks, $6.31, at 12:19 PM EST, at 2709 John Milton Street.

For the first category 504 of heterogenous, non-sequential data points, the methodology at 508 collects common types of numerical features. By way of non-limiting example, the number of credit cards is one common type of numerical feature, while total personal checking is another common type of numerical feature.

At 510, the methodology bins each of the common numerical features into continuous numbers and then allocates the continuous numbers into several (n) quantiles, where n is a whole number. By way of non-limiting example, ten (n=10) quantiles could be used, although the invention is not limited to any particular number. The number of quantiles may be the same for different features, but the invention is not so limited, and other numbers of quantiles could be used.

At 512, a first category token is assigned to each quantile, where each token is compatible with a BERT model. The methodology thus replaces raw numerical values with corresponding quantile-based tokens, ensuring that numerical features are represented in a tokenized format that the BERT model can process.

The second category 506 is time-ordered sequences of heterogenous customer transaction related features, such as by way of non-limiting example merchant name, amount of the transaction, time of the transaction, and location of the transaction. The second category may therefore include both numerical and text features.

At 514, for the text features, the methodology tokenizes the transaction histories to generate second category tokens that represent the histories of transaction related features. The tokenizer may be a Byte-Pair Encoding (BPE) tokenizer trained on millions of merchant names, creating a vocabulary of thousands of tokens. By way of non-limiting example, some 20 million merchant names may be used to generate some 30,000 tokens. At 516, the tokenizer encodes the histories of transaction related features, converting each sequence of merchant names in the transaction related features into a BERT compatible form that the BERT model can process.

For the numerical features, the methodology at 518 collects common types of numerical features. By way of non-limiting example, the amounts of the transactions is one common type of numerical feature, while time of the transaction is another common type of numerical feature.

At 520, the methodology bins each of the common numerical features into continuous numbers and then allocates the continuous numbers into several (n) quantiles, where n is a whole number. By way of non-limiting example, ten (n=10) quantiles could be used, although the invention is not limited to any particular number. The number of quantiles may be the same for different features, but the invention is not so limited, and other numbers of quantiles could be used.

At 522, a second category token is assigned to each quantile, where each token is compatible with a BERT model. The methodology thus replaces raw numerical values with corresponding quantile-based tokens, ensuring that numerical features are represented in a tokenized format that the BERT model can process.

At 524, some of the second category tokens 604 will be randomly masked, whereas the first category tokens can be kept unmasked. This enables the BERT model to later learn customer embeddings by predicting the masked transaction tokens based on the surrounding context, which includes both profile and transaction information.

Figure 6:
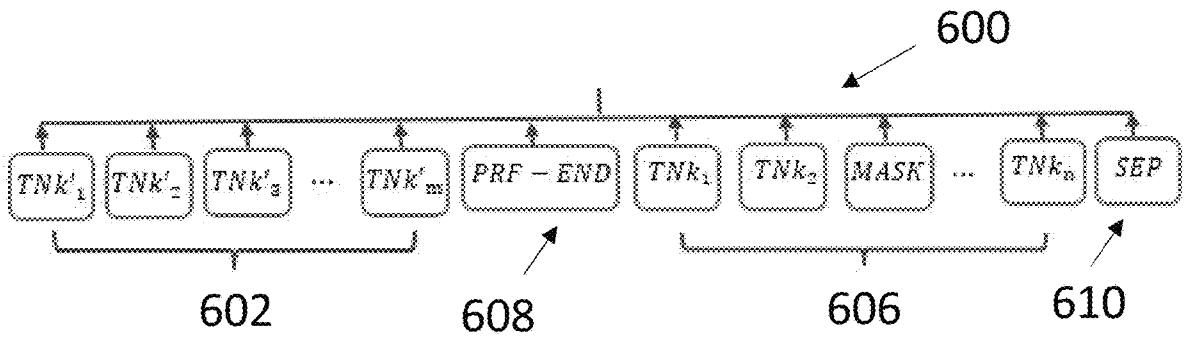
FIG. 6 illustrates collection of tokens for an individual transaction, in accordance with an embodiment.
Figure 7:
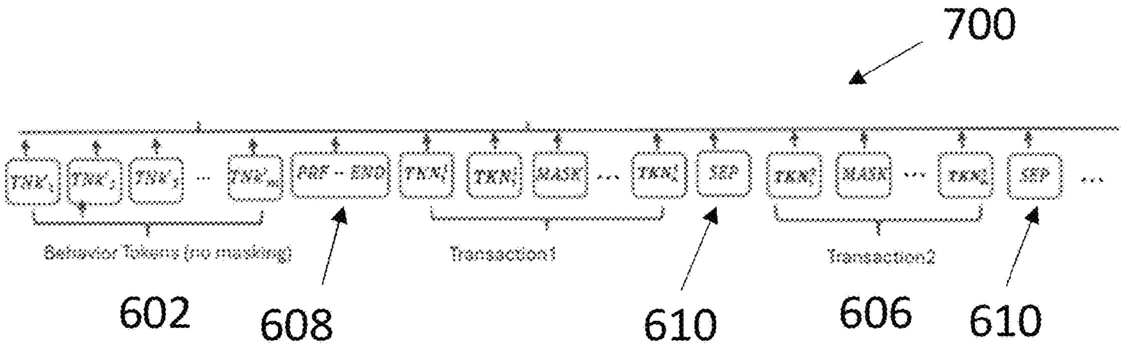
FIG. 7 illustrates collection of tokens for multiple transactions, in accordance with an embodiment.

Referring now also to FIGS. 6 and 7, at 526, the methodology concatenates the first category tokens 602 and the second category tokens 604 as partially masked into a single sequence 606 for each user. The first category tokens 602 precede the second category tokens 604, with the two being separated by a marker token 608 such as by way of non-limiting example "PRF-END". FIG. 6 shows a single sequence 600 of tokens for a single transaction (with some tokens masked, as discussed below), and FIG. 7 shows a single sequence 700 of tokens for multiple transactions. Each set of transaction tokens can end with an end token 610 (e.g., "SEP") to delineate the end of the transaction.

Figure 8:
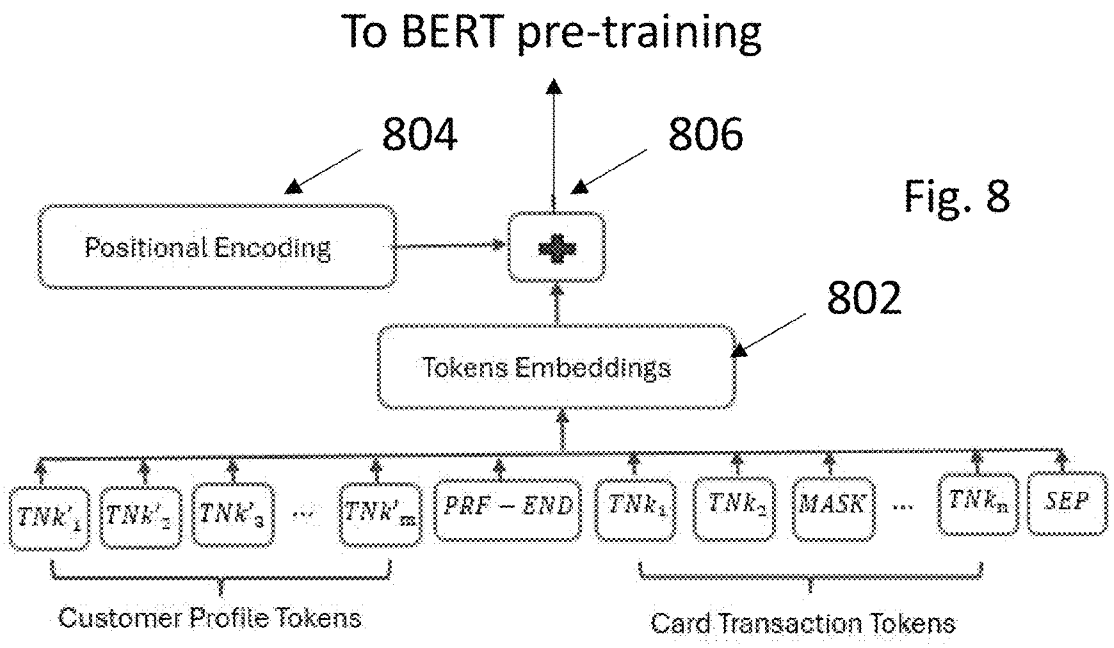
FIG. 8 illustrates collection of tokens and corresponding embeddings being combined with positional encoding, in accordance with an embodiment.

Referring now also to FIG. 8, at 528, the tokens are embedded to create token embeddings 802. The traditional BERT model also uses position embeddings 804 to capture the order of tokens in a sentence, since the transformer model itself is position-agnostic. In the disclosed methodology, position embeddings 804 may be combined at 806 with the token embeddings as output to the BERT model for pre-training.

Figure 9:
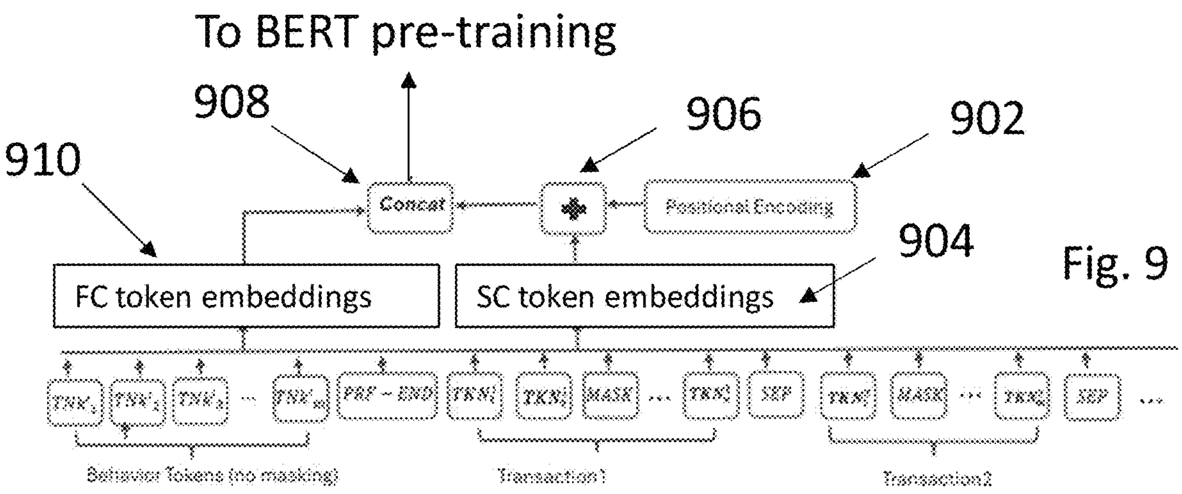
FIG. 9 illustrates a collection of tokens and corresponding embeddings being selectively combined with positional encoding, in accordance with an embodiment.

However, this need not be the case, and positional encoding need not be applied to all token embeddings. Referring now to FIG. 9, positional encoding 902 may only be of interest with respect to token embeddings 904 for the second category of tokens, and they are combined at 906. At 908, the token embeddings 910 of the first category of tokens are concatenated with the combination from 906, and the result is sent to the BERT model for pre-training.

As discussed above, the second category 506 of time-ordered sequences of heterogenous customer transaction related features may include the location of the transaction. In one embodiment, the location is processed per the methodology above. In an alternative embodiment, location data is processed similarly to numerical data from the first category 504.

Figure 10:
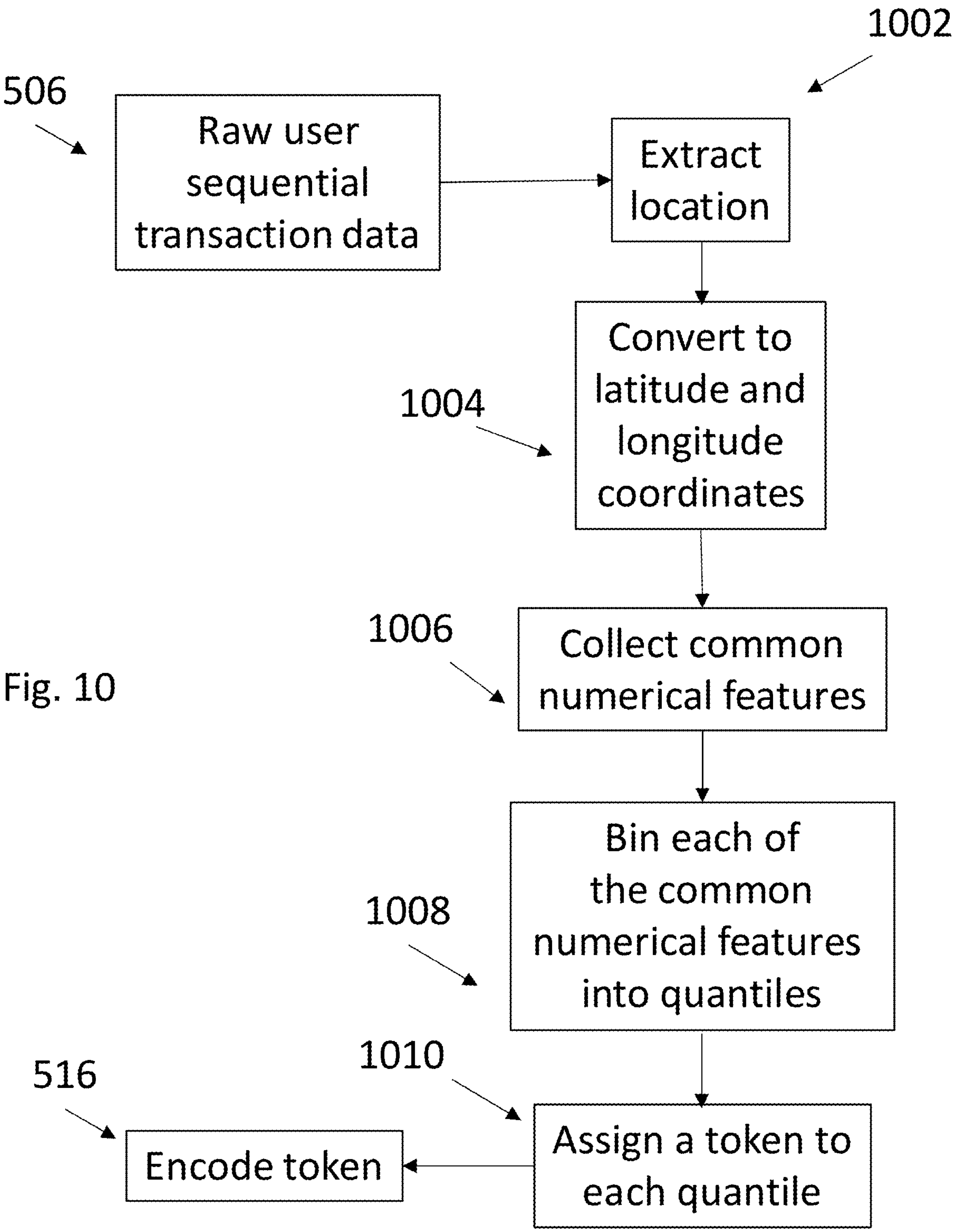
FIG. 10 illustrates an exemplary flow chart of a process for training and deploying a low power BERT model that can process location information, in accordance with an embodiment.

Specifically, referring now to FIG. 10, the methodology identifies the latitude and longitude coordinates at which the transaction takes place, which could be the physical location of the transaction or, if an online transaction, the location of the purchaser and/or the location of the remote vendor. These coordinates may already be available in the second category 506, but if not, the location (e.g., transaction address) is extracted from second category 506 at 1002 and converted into latitude and longitude coordinates at 1004.

At 1006, the methodology collects common numerical features. In this example, latitude is one feature, and longitude is another feature. At 1008, the methodology bins each of the common numerical features into continuous numbers and then allocates the continuous numbers into several (n) quantiles (e.g., 10 quantiles). At 1010, a second category token is assigned to each quantile, where each token is compatible with a BERT model. These second category tokens are specific to location and represent numbers, such that they can either be masked as with other second category tokens, or excluded from masking. The methodology thus replaces raw numerical values of the latitude and longitude with corresponding quantile-based tokens, ensuring that numerical features are represented in a tokenized format that the BERT model can process.

The BERT model that receives the results of the above-methodology may be a traditional BERT model. However, the invention is not so limited, and a modified BERT model could be used. By way of non-limiting example, the Next Sentence Prediction (NSP) may not be needed because the data does not rely on the results of that processing. The NSP could be disabled, thereby reducing the processing time and power requirements to train the BERT model.

After the BERT model is pre-trained, the embeddings can then be fine-tuned for downstream tasks, such as predicting the likelihood of a customer making a booking.

Once trained and fine-tuned, the BERT model is presented with a query that includes textual and numerical features, which the BERT model processes and provides an appropriate output answer.

With the BERT model pre-trained as above, the resulting BERT model provides a technical solution to several technical problems of the applied art. One technical solution is that the methodology allows BERT to receive and process NPL query content that includes numbers intermixed with text, as well as large numbers, which the traditional BERT model simply could not process. Another technical solution is that the BERT program provides higher accuracy in its results than traditional BERT models with other modifications, which reduces the probability that a user will have to modify and rerun the query to the BERT model; this directly results in savings in both computer processing and electrical power that would otherwise be devoted toward serial re-submissions of queries to the BERT model until a satisfactory answer was reached.

Another feature is the use of a specific loss function for the BERT model. A loss function is used to quantify how far the predicted masked tokens are from the true masked tokens. Traditional BERT uses a use cross-entropy loss function defined by:

$$\mathcal{L}_{rt} = -\sum_{i \in regular\ masked\ positions} y_i \cdot \log(p(y_i))$$

Embodiments herein may use that loss function as well. In the alternative, embodiments herein may use that loss function for textual data. For numerical features that have been subject to binning, a distance-based weighting mechanism that calculates the distance between the correct masked token and the predicted token within the binned space and assign the weight to the loss can be used:

$$\mathcal{L}_{bt} = -\sum_{i \in binned\ masked\ positions} w(y_i, \hat{y}_i) \cdot (y_i \cdot \log(p(y_i)))$$

Where:

yi is the true token for the i-th masked position;

p(yi) is the predicted probability that the model assigns to the true token;

$\hat{y}_i$ is the predicted token for $y_i$; and w is given by either of the below equations:

$$w(y_i, \hat{y}_i) = \frac{1}{1 + dist(y_i, \hat{y}_i)}$$

or $$w(y_i, \hat{y}_i) = \exp\left(-\frac{dist(y_i, \hat{y}_i)^2}{2\sigma^2}\right)$$

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing a combination of text and numbers by a Bidirectional Encoder Representations from Transformers (BERT) model natural language processor, the method comprising:

creating, for a user, a set of non-sequential data points from user data of only numerical features;

first binning only overlapping types of numerical features from the non-sequential data points into consecutive numbers;

first allocating the consecutive numbers as binned into a plurality of quantiles;

first assigning a first category token to each of the plurality of quantiles, each of the first category tokens being BERT compatible;

creating a time ordered sequence of transactions of the user including text features and numerical features;

second assigning second category tokens to the time ordered sequence of user transactions;

concatenating the first category tokens and the second category tokens into a sequence;

pre-training the BERT model based on the sequence; and submitting a query including text features and numerical features to the trained BERT model.

2. The method of claim 1, further comprising:

masking, between the second assigning and the concatenating, at least some of the second category tokens.

3. The method of claim 2, further comprising:

maintaining, between the second assigning and the concatenating, the first category tokens in an unmasked state.

4. The method of claim 1, further comprising:

disabling Next Sentence Prediction from the BERT prior to the submitting; and wherein the BERT processes the query without applying the Next Sentence Prediction.

5. The method of claim 1, wherein the sequence includes a marker token between the first category tokens and the second category tokens, the marker token representing an end of the first category tokens and a beginning of the second category tokens.

6. The method of claim 1, wherein the time ordered sequence of transactions includes location data for the transactions, the method further comprising:

determining latitude and longitude coordinates for the transactions;

second binning latitude coordinates and longitudinal coordinates from the transactions into a first set and a second set of consecutive numbers, respectively;

second allocating the first set and the second set into quantiles; and third assigning a second category token to each of the quantiles from the second allocating.

7. The method of claim 6, further comprising:

combining positional encoding with second category tokens embeddings from the second and third assigning;

concatenating the first category tokens with the result of the combining; and wherein the pre-training the BERT model based on the sequence comprises pre-training the BERT model with the result of the concatenating.

8. The method of claim 1, further comprising:

establishing a loss function for the BERT model to apply on results of numbers subject to the first binning, the loss function being defined by:

$$\mathcal{L}_{bt} = -\sum_{i \in \text{binned masked positions}} w(y_i, \hat{y}_i) \cdot (y_i \cdot \log(p(y_i)))$$

Where:

yi is the true token for the i-th masked position;

p(yi) is the predicted probability that the model assigns to the true token;

ŷi is the predicted token for yi; and w is given by either of the below equations:

$$w(y_i, \hat{y}_i) = \frac{1}{1 + dist(y_i, \hat{y}_i)}$$

or $$w(y_i, \hat{y}_i) = \exp\left(-\frac{dist(y_i, \hat{y}_i)^2}{2\sigma^2}\right).$$

9. The method of claim 1, further comprising:

wherein the second assigning comprises for the numerical features of the time ordered sequence of transactions:

third binning overlapping types of numerical features from the time ordered sequence of transactions into consecutive numbers;

third allocating the consecutive numbers as binned into a plurality of quantiles;

fourth assigning a second category token to each of the plurality of quantiles from the third allocating, each of the second category tokens being BERT compatible;

wherein the second assigning comprises for the text features of the time ordered sequence of transactions:

fifth assigning a second category token to each of the text features; and encoding the second category tokens of the fifth assigning into BERT compatible format.

10. A non-transitory computer-readable medium storing a set of instructions for processing a combination of text and numbers by a Bidirectional Encoder Representations from Transformers (BERT) model natural language processor, the set of instructions, when executed by one or more processors of a device, cause the device to perform operations comprising:

creating, for a user, a set of non-sequential data points from user data of only numerical features;

first binning only overlapping types of numerical features from the non-sequential data points into consecutive numbers;

first allocating the consecutive numbers as binned into a plurality of quantiles;

first assigning a first category token to each of the plurality of quantiles, each of the first category tokens being BERT compatible;

creating a time ordered sequence of transactions of the user including text features and numerical features;

second assigning second category tokens to the time ordered sequence of user transactions;

concatenating the first category tokens and the second category tokens into a sequence;

pre-training the BERT model based on the sequence; and submitting a query including text features and numerical features to the trained BERT model.

11. The non-transitory computer-readable medium of claim 10, the operations further comprising:

masking, between the second assigning and the concatenating, at least some of the second category tokens.

12. The non-transitory computer-readable medium of claim 11, the operations further comprising:

maintaining, between the second assigning and the concatenating, the first category tokens in an unmasked state.

13. The non-transitory computer-readable medium of claim 10, the operations further comprising:

disabling Next Sentence Prediction from the BERT prior to the submitting; and wherein the BERT processes the query without applying the Next Sentence Prediction.

14. The non-transitory computer-readable medium of claim 10, wherein the sequence includes a marker token between the first category tokens and the second category tokens, the marker token representing an end of the first category tokens and a beginning of the second category tokens.

15. The non-transitory computer-readable medium of claim 10, wherein the time ordered sequence of transactions includes location data for the transactions, the operations further comprising:

determining latitude and longitude coordinates for the transactions;

second binning latitude coordinates and longitudinal coordinates from the transactions into a first set and a second set of consecutive numbers, respectively;

second allocating the first set and the second set into quantiles; and third assigning a second category token to each of the quantiles from the second allocating.

16. The non-transitory computer-readable medium of claim 15, the operations further comprising:

combining positional encoding with second category tokens embeddings from the second and third assigning;

concatenating the first category tokens with the result of the combining; and wherein the pre-training the BERT model based on the sequence comprises pre-training the BERT model with the result of the concatenating.

17. The non-transitory computer-readable medium of claim 10, the operations further comprising:

establishing a loss function for the BERT model to apply on results of numbers subject to the first binning, the loss function being defined by:

$$\mathcal{L}_{bt} = -\sum_{i \in binned\ masked\ positions} w(y_i, \hat{y}_i) \cdot (y_i \cdot \log(p(y_i)))$$

Where:

yi is the true token for the i-th masked position;

p(yi) is the predicted probability that the model assigns to the true token;

ŷi is the predicted token for yi; and w is given by either of the below equations:

$$w(y_i, \hat{y}_i) = \frac{1}{1 + dist(y_i, \hat{y}_i)}$$

or $$w(y_i, \hat{y}_i) = \exp\left(-\frac{dist(y_i, \hat{y}_i)^2}{2\sigma^2}\right).$$

18. The non-transitory computer-readable medium of claim 10, the operations further comprising:

wherein the second assigning comprises for the numerical features of the time ordered sequence of transactions:

third binning overlapping types of numerical features from the time ordered sequence of transactions into consecutive numbers;

third allocating the consecutive numbers as binned into a plurality of quantiles;

fourth assigning a second category token to each of the plurality of quantiles from the third allocating, each of the second category tokens being BERT compatible;

wherein the second assigning comprises for the text features of the time ordered sequence of transactions:

fifth assigning a second category token to each of the text features; and encoding the second category tokens of the fifth assigning into BERT compatible format.

19. A system for processing a combination of text and numbers by a Bidirectional Encoder Representations from Transformers (BERT) model natural language processor, the system comprising:

a processor;

a non-transitory computer readable storage media storing a set of instructions programmed to cooperate with the processor to cause the processor to perform operations comprising:

creating, for a user, a set of non-sequential data points from user data of only numerical features;

first binning only overlapping types of numerical features from the non-sequential data points into consecutive numbers;

first allocating the consecutive numbers as binned into a plurality of quantiles;

first assigning a first category token to each of the plurality of quantiles, each of the first category tokens being BERT compatible;

creating a time ordered sequence of transactions of the user including text features and numerical features;

second assigning second category tokens to the time ordered sequence of user transactions;

concatenating the first category tokens and the second category tokens into a sequence;

pre-training the BERT model based on the sequence; and submitting a query including text features and numerical features to the trained BERT model.

20. The system of claim 19, the operations further comprising:

masking, between the second assigning and the concatenating, at least some of the second category tokens.

* * * * *